US011368616B2

(12) United States Patent
Okabe et al.

(10) Patent No.: US 11,368,616 B2
(45) Date of Patent: Jun. 21, 2022

(54) VEHICLE DISPLAY CONTROL DEVICE, DISPLAY CONTROL METHOD, AND NON-TRANSITORY COMPUTER-READABLE MEDIUM

(71) Applicant: PANASONIC INTELLECTUAL PROPERTY MANAGEMENT CO., LTD., Osaka (JP)

(72) Inventors: Yoshimasa Okabe, Kanagawa (JP); Masayoshi Michiguchi, Kanagawa (JP); Yuya Hamai, Kanagawa (JP); Masato Inoue, Kanagawa (JP); Masazumi Yamazaki, Kanagawa (JP); Takanori Setsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/146,954

(22) Filed: Jan. 12, 2021

(65) Prior Publication Data
US 2021/0306551 A1    Sep. 30, 2021

(30) Foreign Application Priority Data

Mar. 25, 2020  (JP) .............................. JP2020-054581

(51) Int. Cl.
*H04N 5/232*    (2006.01)
*H04N 7/18*     (2006.01)
(Continued)

(52) U.S. Cl.
CPC ........... *H04N 5/23216* (2013.01); *B60R 1/00* (2013.01); *B60R 11/0229* (2013.01);
(Continued)

(58) Field of Classification Search
CPC ....... B60R 1/00; B60R 11/0229; B60R 11/04; B60R 2011/0003; B60R 2011/004;
(Continued)

(56) References Cited

U.S. PATENT DOCUMENTS

2015/0302259 A1   10/2015   Oshida et al.
2017/0024861 A1    1/2017   Arata et al.
(Continued)

FOREIGN PATENT DOCUMENTS

WO     2014/129026     8/2014
WO     2015/162910    10/2015

*Primary Examiner* — Farzana Hossain
(74) *Attorney, Agent, or Firm* — Greenblum & Bernstein, P.L.C.

(57) ABSTRACT

A vehicle display control device is configured to perform operations including: performing processing for hindering visual recognition of an occupant of a vehicle on a captured image captured by an image-capturing device; generating a display image; acquiring information indicating a state of the vehicle and information regarding a surrounding environment of the vehicle; and determining whether the vehicle is in a first condition. In a case where it is determined that the vehicle is in the first condition, a display image obtained by prohibiting application of the processing to the captured image or by reducing an application degree of the processing is generated, and is displayed by the display device.

14 Claims, 8 Drawing Sheets

(51) Int. Cl.
*B60R 11/04* (2006.01)
*B60R 1/00* (2022.01)
*B60R 11/02* (2006.01)
*G06V 20/58* (2022.01)
*G06V 20/59* (2022.01)
*B60R 11/00* (2006.01)

(52) U.S. Cl.
CPC ............ *B60R 11/04* (2013.01); *G06V 20/584* (2022.01); *G06V 20/597* (2022.01); *H04N 7/181* (2013.01); *B60R 2011/0003* (2013.01); *B60R 2011/004* (2013.01); *B60R 2300/105* (2013.01); *B60R 2300/303* (2013.01); *B60R 2300/605* (2013.01)

(58) Field of Classification Search
CPC ........ B60R 2300/105; B60R 2300/303; B60R 2300/605; G06K 9/00825; G06K 9/00845; H04N 5/23216; H04N 7/181; H04N 5/23219; H04N 5/23229; H04N 5/23293; H04N 5/247; H04N 5/2624; G06V 20/584; G06V 20/597; G06V 40/18
See application file for complete search history.

(56) References Cited

U.S. PATENT DOCUMENTS

| | | | | |
|---|---|---|---|---|
| 2020/0234583 A1* | 7/2020 | Shiota | .................. | G06F 3/14 |
| 2020/0333608 A1* | 10/2020 | Katagiri | ................ | B60K 35/00 |
| 2021/0221434 A1* | 7/2021 | Liu | .................. | B60W 60/0015 |

* cited by examiner 601   602   603

VEHICLE DISPLAY CONTROL DEVICE, DISPLAY CONTROL METHOD, AND NON-TRANSITORY COMPUTER-READABLE MEDIUM

FIELD

The present disclosure relates to a vehicle display control device, a display control method, and a non-transitory computer-readable medium.

BACKGROUND

In recent years, a vehicle display device that supports driving by processing an image captured by a camera mounted on a vehicle and presenting the image to a driver of the vehicle has begun to be widely used. For example, there is a vehicle having a configuration in which a camera is used instead of a side mirror provided on the vehicle and an image captured by the camera is displayed on a display device in the vehicle.

WO 2015/162910 A1 discloses a configuration with which, when displaying an image captured by an on-vehicle camera, a region near the vehicle is displayed as it is in the image, and a region far from the vehicle is displayed in a blurred manner in the image. Accordingly, it is easy for a driver to grasp a sense of distance when referring to the display image.

SUMMARY

On the other hand, in a predetermined condition, when a part of the display image is blurred as in WO 2015/162910 A1, visual recognition of the surroundings for the driver may be hindered.

The present disclosure has been made in view of the above circumstances, and an object thereof is to provide a vehicle display control device, a display control method, and a non-transitory computer-readable medium that, according to a condition of a vehicle or a surrounding condition of the vehicle, provide a driver with image display that prompts more appropriate visual recognition of a surrounding environment of the vehicle.

The present disclosure provides a vehicle display control device configured to control a display image to be displayed by a display device installed in a vehicle, the vehicle display control device including: a processor; and a memory including instructions that, when executed by the processor, cause the processor to perform operations including: performing processing for hindering visual recognition of an occupant of the vehicle on a captured image captured by one or more image-capturing devices installed on the vehicle, and generating the display image; acquiring first information indicating a state of the vehicle and second information regarding a surrounding environment of the vehicle; determining whether the vehicle is in a first condition based on at least one of the first information and the second information; and generating, in a case where it is determined that the vehicle is in the first condition, the display image obtained by prohibiting application of the processing to the captured image or by reducing an application degree of the processing, and causing the display device to display the display image.

Further, the present disclosure provides a display control method for controlling a display image to be displayed by a display device installed in a vehicle, the display control including: performing processing for hindering visual recognition of an occupant of the vehicle on a captured image captured by one or more image-capturing devices installed on the vehicle, and generating the display image to be displayed by the display device; acquiring first information indicating a state of the vehicle and second information regarding a surrounding environment of the vehicle; determining whether the vehicle is in a first condition based on at least one of the first information and the second information; and generating, in a case where it is determined that the vehicle is in the first condition, the display image obtained by prohibiting application of the processing to the captured image or by reducing an application degree of the processing, and causing the display device to display the display image.

Further, the present disclosure provides a non-transitory computer-readable medium having stored a computer program that, when executed by a processor, causes a display control device as a computer installed on a vehicle to perform operations including: performing processing for hindering visual recognition of an occupant of the vehicle on a captured image captured by one or more image-capturing devices installed on the vehicle, and generating a display image to be displayed by a display device installed in the vehicle; acquiring first information indicating a state of the vehicle and second information regarding a surrounding environment of the vehicle; determining whether the vehicle is in a first condition based on at least one of the first information and the second information; and generating, in a case where it is determined that the vehicle is in the first condition, the display image obtained by prohibiting application of the processing to the captured image or by reducing an application degree of the processing, and causing the display device to display the display image.

Optional combinations of the above components and presentation of the present disclosure converted between methods, devices, systems, recording media, computer programs, and the like are effective as aspects of the present disclosure.

According to the present disclosure, image display that prompts more appropriate visual recognition of a surrounding environment of a vehicle can be provided to a driver according to a condition of the vehicle or a surrounding condition of the vehicle.

DETAILED DESCRIPTION

Hereinafter, embodiments of a vehicle display control device, a display control method, and a program according to the present disclosure will be described in detail with reference to the accompanying drawings. However, unnecessarily detailed descriptions may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure for those skilled in the art, and are not intended to limit the subject matter recited in the claims.

First Embodiment

[Configuration Outline of Vehicle and Display Control Device]

Figure 1:
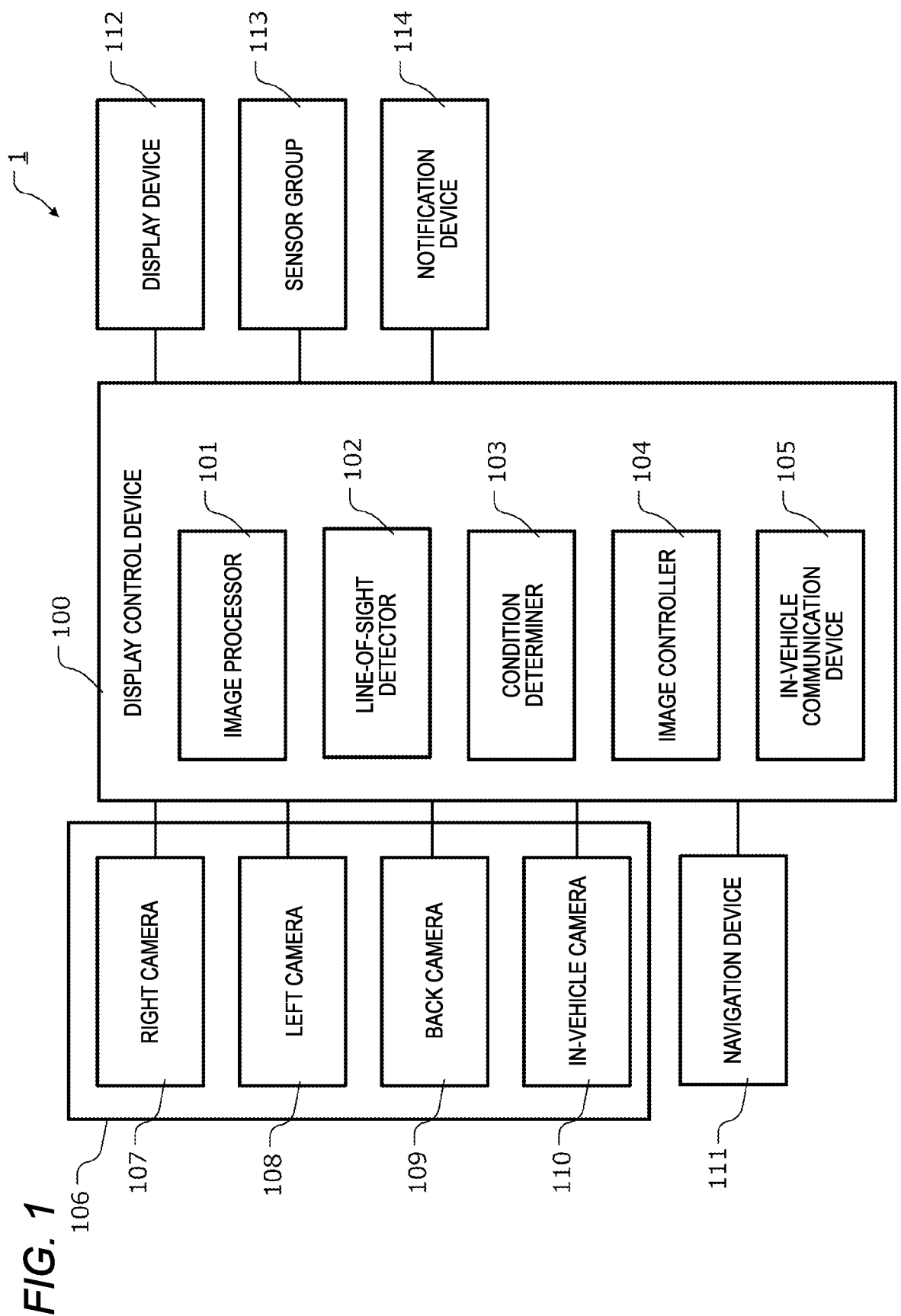
FIG. 1 is a diagram illustrating an internal configuration example of a vehicle according to a first embodiment.
Figure 2:
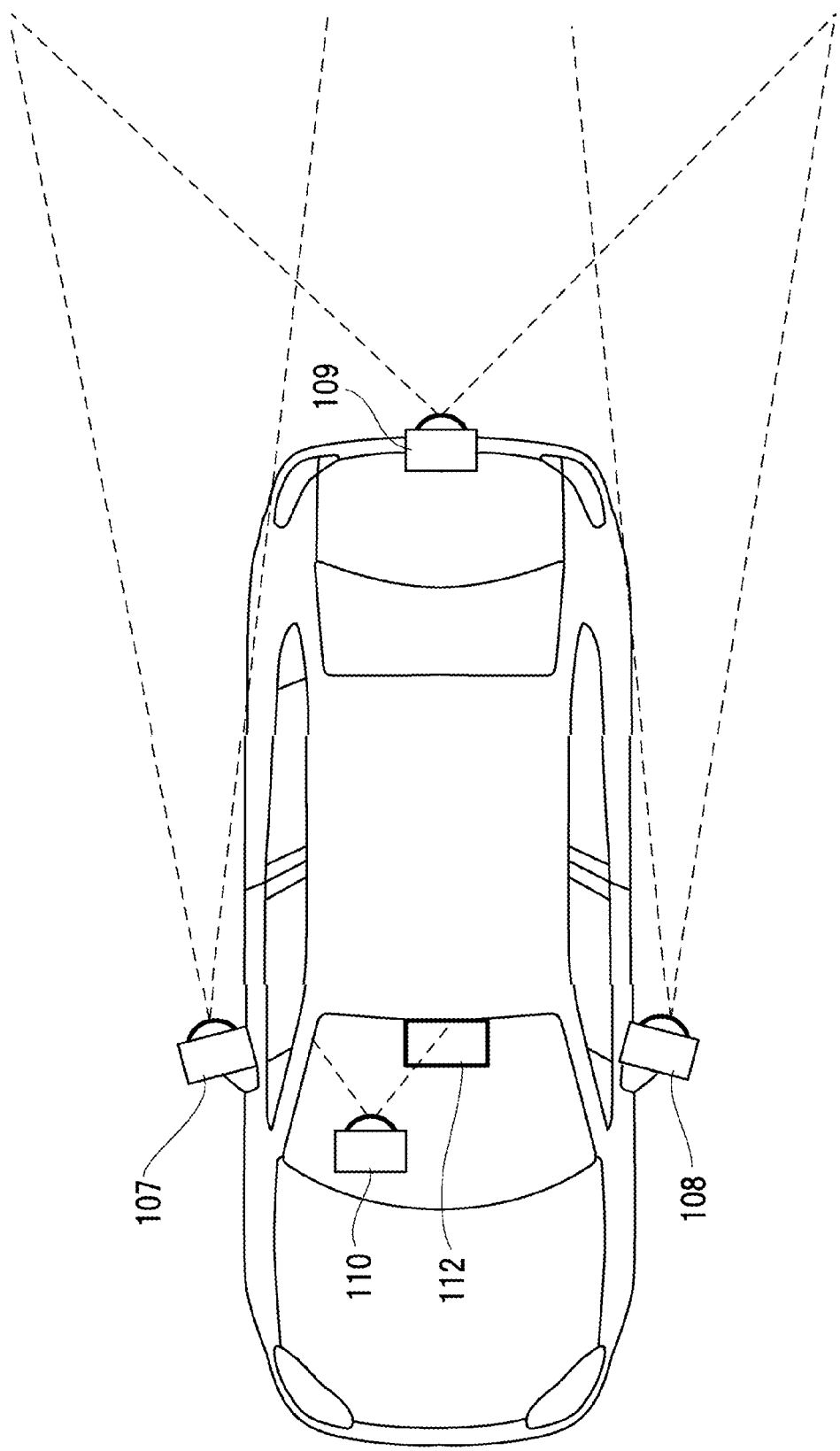
FIG. 2 is a vehicle top view illustrating an arrangement example of cameras in a camera group shown in FIG. 1.
Figure 3:
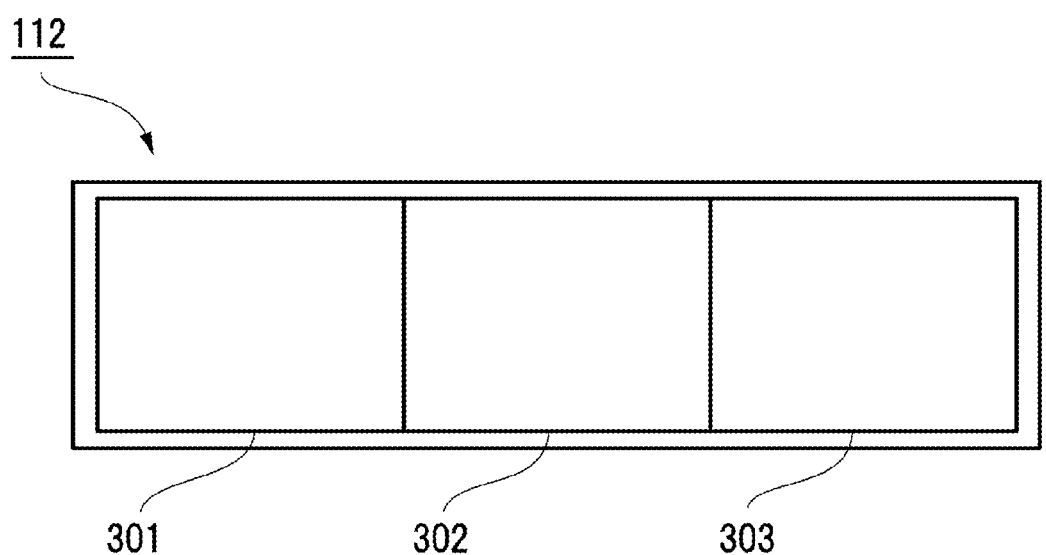
FIG. 3 is a diagram illustrating a configuration example of a display image of a display device shown in FIG. 1.

A configuration of a vehicle 1 according to a first embodiment will be described with reference to FIGS. 1 to 3. FIG. 1 is a diagram illustrating an internal configuration example of the vehicle 1 according to the first embodiment. FIG. 2 is a vehicle top view illustrating an arrangement example of cameras in a camera group 106 shown in FIG. 1. FIG. 3 is a diagram illustrating a display image example of a display device 112 shown in FIG. 1. In the following description, the vehicle 1 indicates an own vehicle in which a display control device 100 as an example of a vehicle display control device according to the first embodiment is installed. Although a case of driving on the left-hand side of a road will be described in the first embodiment, the present disclosure is not limited thereto, and can be applied to driving on the right-hand side of a road.

As shown in FIG. 1, the vehicle 1 includes the display control device 100 according to the first embodiment, the camera group 106, a navigation device 111, the display device 112, a sensor group 113, and a notification device 114. The camera group 106 and the sensor group 113 acquire various types of information regarding a driving environment of the vehicle 1.

The vehicle 1 according to the first embodiment is a four-wheeled vehicle having four wheels, and includes a pair of front wheels that are rotatably supported by a front axle, and a pair of rear wheels that are rotatably supported by a rear axle. The vehicle 1 according to the first embodiment also includes a camera monitoring system (CMS).

That is, the vehicle 1 is configured as a so-called mirrorless vehicle that does not include a rearview mirror for checking a back side of the vehicle 1 or side mirrors for checking left and right sides of the vehicle 1. In the vehicle 1 as a mirrorless vehicle, the camera group 106 serving as an image-capturing device captures images of a back side and left and right sides of the vehicle 1, and the captured images are displayed on a display (not shown) provided in the display device 112 disposed inside the vehicle 1. Thus, the vehicle 1 is configured to allow the driver to visually recognize the back side and the left and right sides of the vehicle 1. In addition, the camera group 106 captures an image of an interior of the vehicle 1. The captured image captured by the camera group 106 is used for various types of control of the vehicle 1. The vehicle 1 according to the first embodiment may include the rearview mirror and the side mirrors described above.

In the following description, as the CMS, a configuration will be described as an example, in which one display device 112 is installed at a position where a conventional rearview mirror is installed, and a display image generated by subjecting a captured image regarding the surroundings of the vehicle 1 to image processing is displayed on the display installed in the display device 112. However, the configuration of the vehicle 1 is not limited to this configuration. For example, a plurality of display devices 112 corresponding to the conventional side mirrors may be installed on the left and right sides at a front part inside the vehicle 1, and each of a plurality of display images generated by subjecting the captured images of the surroundings to image processing may be displayed on each of the plurality of display devices 112 installed on the left and rights at the front part.

Although an example of a driving motor (not shown) included in the vehicle 1 according to the first embodiment is an electric motor, the present invention is not limited thereto, and an internal combustion engine or a combination thereof may be used. The driving motor includes a rotation mechanism, and causes the vehicle 1 to run by applying kinetic energy to the vehicle 1 by rotationally driving the rotation mechanism. In addition, a braking mechanism (not shown) included in the vehicle 1 is a mechanism for braking the wheels, and is, for example, a transmission and a brake mechanism. The braking mechanism decelerates or stops the vehicle 1 by applying a torque for deceleration (braking force) to a drive shaft (not shown) of the wheels.

As illustrated in FIGS. 1 and 2, the camera group 106, as an example of the image-capturing device and an acquisition device, includes at least a right camera 107, a left camera 108, a back camera 109, and an in-vehicle camera 110. Each of the right camera 107, the left camera 108, the back camera 109, and the in-vehicle camera 110 is configured to include an image pick-up device such as a charge coupled device (CCD) or a complementary metal-oxide semiconductor (CMOS), and transmits image-capturing information obtained in capturing an image of a predetermined image-capturing target to the display control device 100. The image-capturing information may include attribute information (setting information, date and time, location, and the like) at the time of image-capturing in addition to the captured image.

The right camera 107 and the left camera 108 are fixed and supported by a pair of camera support portions respectively, each of which protrudes outward in a vehicle width direction at a front end portion of a side door of the vehicle 1. The right camera 107 and the left camera 108 are arranged such that optical axes thereof are directed in a left-right direction and toward the back side of the vehicle 1, that is, obliquely back side of the vehicle 1. Each of the right camera 107 and the left camera 108 captures an image of an image-capturing target located in the left-right direction of the vehicle 1 at an angle of view expanding in a predetermined angle range in the left-right direction of the vehicle 1.

The back camera 109 is disposed, for example, above a back bumper of the vehicle 1. The back camera 109 is disposed with the optical axis thereof directed to a road surface behind a vehicle body of the vehicle 1, and captures an image of an image-capturing target located behind at an angle of view that expands in a predetermined angle range toward the back side of the vehicle 1.

The in-vehicle camera 110 is a camera for capturing an image of the interior of the vehicle 1. The in-vehicle camera 110 is disposed such that at least the driver of the vehicle 1 is located within the angle of view thereof, and captures an image of the interior of the vehicle 1 including the driver. In a case of the example of FIG. 2, the vehicle 1 has a configuration of right-hand drive, and the in-vehicle camera 110 is disposed in front of a driver's seat. It is needless to say that the vehicle 1 may be a vehicle having a configuration of left-hand drive.

In addition to the above cameras, the camera group 106 may further include a compound-eye camera (not shown) functioning as a front camera. The compound-eye camera is installed inside the vehicle 1 at a position close to an upper end portion of a windshield of the vehicle 1, for example. The compound-eye camera is disposed with an optical axis thereof directed toward a road surface in front of the vehicle 1, and captures an image of an image-capturing target located in front thereof in a visual field that expands within a predetermined angle range in front of the vehicle 1. In addition, the compound-eye camera includes a plurality of camera sensors (image pick-up devices). Therefore, the compound-eye camera generates a plurality of distance images based on the principle of triangulation by capturing images of a front side of the vehicle 1, for example, and recognizes image-capturing targets including an obstacle in front of the vehicle 1 based on the plurality of distance images. The compound-eye camera measures a distance between the vehicle 1 (that is, an installation position of the compound-eye camera) and a recognized image-capturing target. That is, the compound-eye camera captures images of the same object (image-capturing target) from different image-capturing positions, and can specify a distance between the compound-eye camera and the object and a location of the object with respect to the vehicle 1, by using the fact that an imaging point formed on the captured image of each of the plurality of camera sensors varies with a distance from the image-captured object.

As described, the right camera 107, the left camera 108, the back camera 109, and the in-vehicle camera 110 are disposed on the vehicle 1 according to the first embodiment. The vehicle 1 acquires various types of information regarding the driving environment around the vehicle 1 based on the plurality of captured images captured by the right camera 107, the left camera 108, the back camera 109, and the in-vehicle camera 110.

The navigation device 111 as an example of the acquisition device is, for example, an on-vehicle display device, and displays a current location of the vehicle 1 and a route to a destination when the vehicle 1 is running or stopped, and guides the driver of the vehicle 1. The route guidance to the destination executed by the navigation device 111 is performed with map information, instruction information or the like being displayed on the on-vehicle display device at the same time. Further, based on information on a destination input by the driver or a passenger, the navigation device 111 acquires geographic information including road information such as a course of the vehicle 1 (that is, at least a part of the route to the destination), a width of a road in a running direction of the vehicle 1, a lane configuration, a turning radius of the road, and altitude change, and transmits the geographical information to the display control device 100. The map information or the geographical information is acquired, for example, with the latest data via a communication device (not shown) that is provided in the navigation device 111 and that is connected to the outside so as to enable data communication. The navigation device 111 overwrites existing map information or geographical information with the latest map information or geographical information acquired in a timely manner for update, and records and manages the latest map information or the geographical information in a memory (not shown) in the navigation device 111.

The display device 112 as an example of the display device is a part of the CMS as described above, and as a part of the CMS, includes, for example, a display disposed inside the vehicle 1, and displays a display image generated by the display control device 100. The display of the display device 112 is configured using, for example, a liquid crystal display (LCD) or organic electro luminescence (EL). For example, the display of the display device 112 may be fixed and supported via a support implement suspended from a roof of the vehicle body in place of a rearview mirror at a position where the rearview mirror is disposed in a conventional vehicle. FIG. 2 illustrates an example of an arrangement position of the display of the display device 112 according to the first embodiment.

The display device 112 aggregates screens to one place, which are generated by the display control device 100 using all the image-capturing information (captured images) obtained in image capturing by the right camera 107, the left camera 108, and the back camera 109, and displays the aggregated screens for the driver of the vehicle 1. Specifically, as illustrated in FIG. 3, the display of the display device 112 is formed in an elongated plate shape extending in the vehicle width direction (left-right direction), similarly to a shape of the conventional rearview mirror, and the display image is divided into three in the left-right direction.

In a case where a plurality of displays are installed, the display device 112 may display one or a plurality of display images, which are generated by the display control device 100 using all the image-capturing information (captured images) obtained in image capturing by the right camera 107, the left camera 108, and the back camera 109, in correspondence with the number of the displays and installation positions of the displays. For example, in a case where display devices 112 are installed on the left and right sides at a front part of the vehicle 1 to implement functions of the conventional side mirrors, the display device 112 installed on the right side at the front part of the vehicle 1 displays display images that are generated by the display control device 100 using a plurality of captured images captured by the right camera 107 and the back camera 109. Similarly, the display device 112 installed on the left side at the front part of the vehicle 1 displays display images that are generated by the display control device 100 using a plurality of captured images captured by the left camera 108 and the back camera 109.

Specifically, the display of the display device 112 includes a plurality of display areas. On a screen 301 on the left side of the display, a display image generated based on a captured image captured by the left camera 108 is displayed. On a screen 303 on the right side of the display, a display image generated based on a captured image captured by the right camera 107 is displayed. On a screen 302 at the center of the display, a display image generated based on a captured image captured by the back camera 109 is displayed. On these three screens 301 to 303, not only the captured images may be displayed, but a display image that is just like a single image generated by combining superimposed areas of the angles of view of the right camera 107, the left camera 108, and the back camera 109 may be displayed.

Note that, in the screen division example shown in FIG. 3, the display of the display device 112 is illustrated as being divided into three areas of the same size in correspondence with the right camera 107, the left camera 108, and the back camera 109, but this is merely for convenience. Therefore, after the captured images, which are captured by the right camera 107, the left camera 108, and the back camera 109 respectively, are combined into a single display image, the display image may be divided according to sizes of the screens 301, 302, and 303, and then displayed on the screens. Further, the captured images captured by the right camera 107, the left camera 108, and the back camera 109 may be combined as a single display image, and the display of the display device 112 may display the single display image without being divided into screens as shown in FIG. 3. With the display (provision) of such a display image, the driver of the vehicle 1 can easily and instantly grasp the conditions on the left and right sides and on the back side of the vehicle 1.

The sensor group 113 as an example of the acquisition device includes, for example, an acceleration sensor, a gyro sensor, a radar, an air temperature sensor, a vehicle speed sensor, a sound sensor (microphone), a geomagnetic sensor, a raindrop sensor, a load sensor, a water entry sensor, and the like. The radar is, for example, a millimeter-wave radar, a sonar radar, and light detection and ranging (LiDAR). The various types of sensors included in the sensor group 113 may include other types in addition to those described above in order to detect a condition described later, and the same type of sensor may be provided at a plurality of positions of the vehicle 1 corresponding to detection positions.

The acceleration sensor measures acceleration in a predetermined axial direction of the vehicle 1. The gyro sensor measures, for example, turning in a predetermined axial direction of the vehicle 1, and transmits a measurement result to the display control device 100. A measurement result obtained by the acceleration sensor is used, for example, to detect a change in the running direction of the vehicle 1. The radar emits ultrasonic waves or electromagnetic waves such as millimeter waves for scanning in a limited angular range, and receives reflected waves to measure a time difference between a start time point of emission and a reception time point of the reflected waves. Accordingly, the radar can detect a distance between the vehicle 1 and an obstacle, and a direction of the obstacle seen from the vehicle 1. The radar transmits a measurement result to the display control device 100.

The air temperature sensor measures a temperature of air outside the vehicle 1 and transmits a measurement result to the display control device 100. The air temperature sensor is configured with, for example, an electric circuit of a thermistor. A resistance value of the thermistor changes with temperature. The vehicle speed sensor measures a rotation speed of the wheel of the vehicle 1 and transmits a measurement result to the display control device 100. For example, the vehicle speed sensor measures a pulse period of a rotor that rotates together with the wheel or a drive shaft, and measures the rotation speed of the wheel based on the measured pulse period (that is, the number of the pulses per unit time).

The sound sensor is configured with a microphone, and collects an ambient sound of the vehicle 1, or picks up vibrations of the vehicle 1 and converts the vibrations into a sound signal, and transmits the converted sound signal to the display control device 100. The raindrop sensor measures a degree of adhesion of raindrops to the windshield or to a detection area such as a lens included in a camera, and transmits a measurement result to the display control device 100. The raindrop sensor may be, for example, an optical sensor having a light emitting element that emits light toward the detection area and a light receiving element that receives reflected light reflected by the detection area. The load sensor is installed in a seat of the vehicle 1, detects presence or absence of an occupant, weight shift in the seat, or the like, and transmits a detection result to the display control device 100. The water entry sensor is installed in, for example, an interior space, an engine room, or the like of the vehicle 1, detects entry of water, and transmits a measurement result to the display control device 100.

The notification device 114 as an example of a notification device notifies an occupant of the vehicle 1 (for example, the driver) of various types of information. The notification device 114 includes, for example, a light emitting diode (LED) for performing visual notification, a speaker for performing auditory notification, and the like. The method of notification is not particularly limited, and a configuration other than the above may be provided for notification. In addition, the notification device 114 may be configured integrally with the display device 112.

The display control device 100 according to the first embodiment includes an image processor 101, a line-of-sight detector 102, a condition determiner 103, an image controller 104, and an in-vehicle communication device 105. The display control device 100 is provided inside the vehicle 1 and performs display control of the display device 112 and the notification device 114. The display control device 100 controls the display device 112 and the notification device 114 based on various types of data and detection information transmitted from the camera group 106, the navigation device 111, and the sensor group 113. Accordingly, the display control of the vehicle 1 according to the first embodiment is implemented.

The display control device 100 according to the first embodiment is configured with an electronic control unit (ECU), includes a processing device and a storage device, and implements various functions to be described later by the processing device reading and executing various types of programs stored in the storage device. The processing device is a processor in the first embodiment, and may be replaced with other terms such as a controller and a central processing unit (CPU). The storage device is configured with a read only memory (ROM), a random access memory (RAM), a hard disk drive (HDD), or a combination thereof, and stores information such as programs and data for implementing functions of the ECU. The RAM is configured with, for example, a volatile memory.

The display control device 100 may implement the functions according to the first embodiment, and may be configured with a microcomputer, an integrated circuit, an application specific integrated circuit (ASIC), a programmable logic device (PLD), a field programmable gate array (FPGA), or the like. Further, a part or the whole of the navigation device 111 described above may be configured with separate ECUs in the same manner as the display control device 100. Alternatively, the display control device 100 and the navigation device 111 may be configured with a single ECU.

The image processor 101 acquires the image-capturing information transmitted from the camera group 106, and combines the superimposed regions of the angles of view of the plurality of cameras included in the camera group 106 to generate a display image. The image processor 101 can process a plurality of captured images captured by the cameras in the camera group 106 to generate a display image viewed just like a single image, and display the display image on the display device 112. With this display, the driver can easily and instantly grasp a surrounding condition of the vehicle 1 at a glance without greatly changing his/her line of sight. In the image processor 101, image processing is performed as preprocessing in order to make the image-capturing information available for the line-of-sight detector 102, the condition determiner 103, and the image controller 104.

The line-of-sight detector 102 acquires image-capturing information obtained in image capturing by the in-vehicle camera 110 and transmitted from the camera group 106. Based on a face image of the driver included in the acquired image-capturing information, the line-of-sight detector 102 derives a line-of-sight of the driver from eye movement of the driver, and specifies a direction of the line-of-sight. As a line-of-sight detection method, a known method may be used, and the method is not particularly limited. The line-of-sight detector 102 may also detect behaviors of the driver, such as orientation of the face and movement of the face or the head.

The condition determiner 103 acquires the image-capturing information transmitted from the camera group 106 and the measurement information transmitted from the sensor group 113 as information on the driving environment of the vehicle 1. The condition determiner 103 determines a condition around the vehicle 1 based on at least one type of information of various types of information including the acquired image-capturing information and the measurement information. Details of the condition determined here will be described later.

Based on a determination result of the condition determiner 103, the image controller 104 as an example of the image processor controls the display image to be displayed on the display of the display device 112. Specifically, the display image generated by the image processor 101 is transmitted to the display device 112, and is displayed on the display of the display device 112. In addition, based on the determination result of the condition determiner 103, the image controller 104 generates and transmits a control instruction to switch settings regarding image-capturing of the camera group 106.

The in-vehicle communication device 105 controls transmission and reception of data that is performed via a communication network (for example, a controller area network (CAN)) and Ethernet (registered trademark), and connects components of the vehicle 1 so as to enable bi-directional communication. For example, the in-vehicle communication device 105 transmits and receives, via the communication network, the image-capturing information transmitted from the camera group 106 and the measurement information transmitted from the sensor group 113. Further, the in-vehicle communication device 105 outputs various types of information including the received image-capturing information and measurement information to the image processor 101, the line-of-sight detector 102, the condition determiner 103, and the image controller 104 of the display control device 100 as appropriate. The image processor 101, the line-of-sight detector 102, the condition determiner 103, and the image controller 104 of the display control device 100 perform various types of processing or control regarding display of the vehicle 1 based on the various types of information output from the in-vehicle communication device 105 including the measurement information and the image-capturing information.

The configuration of FIG. 1 is only the configuration of the vehicle 1 according to the first embodiment, and may further include a part related to driving control of the vehicle 1. The driving control here may include control related to automatic driving, driving support, and the like.

Figure 4:
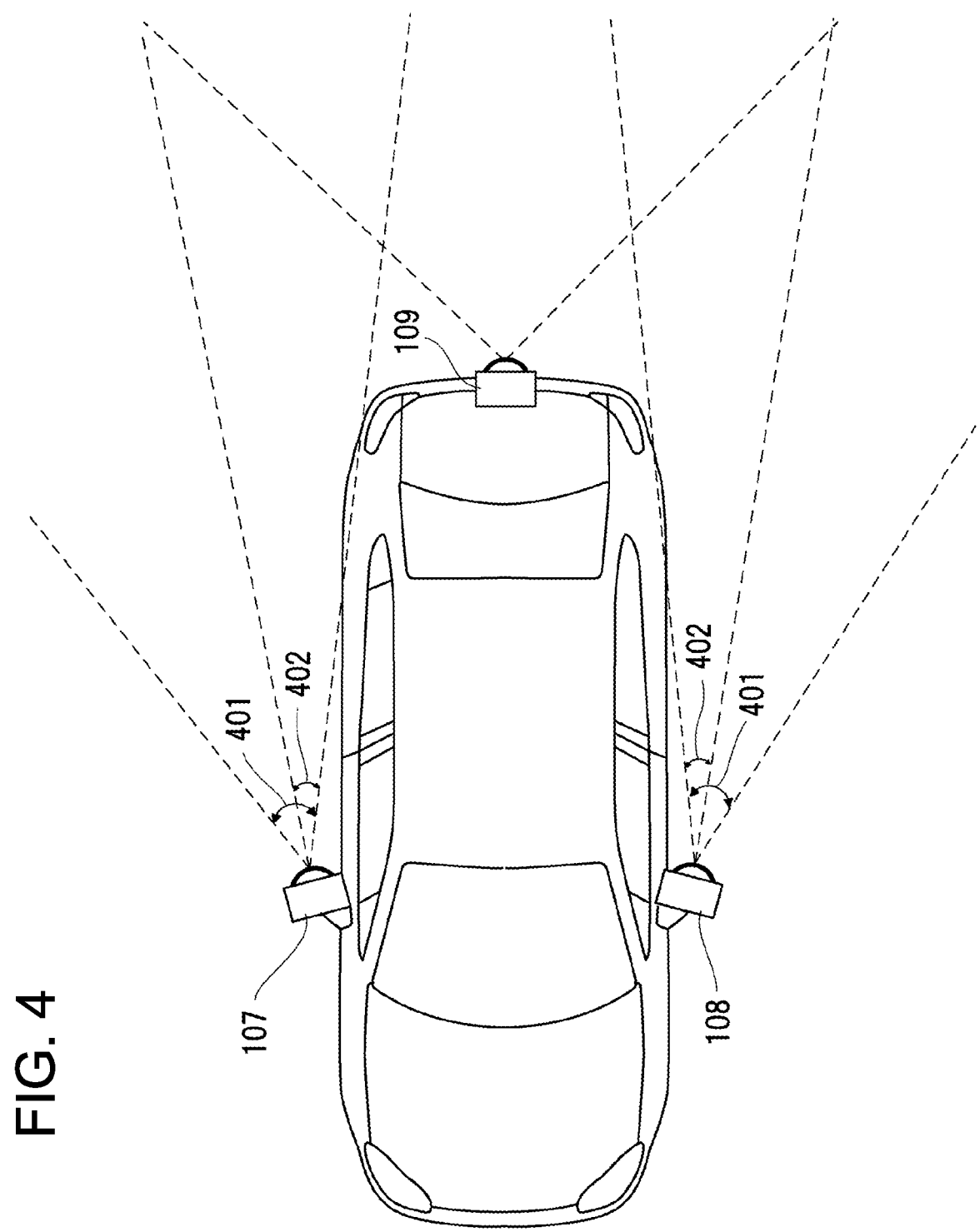
FIG. 4 is a top view for illustrating an example of switching visual field ranges (angles of view) of the cameras according to the first embodiment.

FIG. 4 is a top view for illustrating an example of switching visual field ranges (angles of view) of the camera group 106 according to the first embodiment. In the vehicle 1 according to the first embodiment, the visual field ranges of the right camera 107 and the left camera 108 are switched based on an instruction from the image controller 104 of the display control device 100. Although it is assumed that the visual field range of the back camera 109 is not switched in the first embodiment, the present invention is not limited thereto.

An angle 401 indicates an angle of view of the right camera 107 and the left camera 108 of the time when a visual field range thereof is widened based on a control instruction from the display control device 100. An angle 402 indicates an angle of view of the right camera 107 and the left camera 108 of the time when the visual field range thereof is narrowed based on a control instruction from the display control device 100. In the first embodiment, with respect to the right camera 107 and the left camera 108, it is described that the angle of view indicated by the angle 402 is used in a normal time, and the angle of view indicated by the angle 401 is used when the visual field range is expanded. Although FIG. 4 illustrates an example of switching the angles of view in the left-right direction of the vehicle 1, it is assumed that angles of view of the vehicle 1 in an up-down direction are also switched. Further, an example of two visual field ranges has been described in the first embodiment, but the present invention is not limited thereto, and a configuration may be adopted in which the visual field ranges (angles of view) are switched in more stages (for example, 3 or more stages).

When the visual field ranges are switched, the image processor 101 performs conversion processing for generating a display image capable of displaying a wider range of condition of the vehicle 1 in a captured image in accordance with the angle of view of each camera after the switching. Further, the image processor 101 displays on the display of the display device 112 one display image in which a wider range of the surroundings of the vehicle 1 can be visually recognized than in a normal time. When the visual field ranges are expanded, an area where a captured image of the back camera 109 is displayed is changed according to the visual field ranges (angles of view) of the right camera 107 and the left camera 108, and magnifications of superimposed areas of the angles of view between the captured images captured by the plurality of cameras are controlled to be the same or similar. Display image generation processing may be performed so that lateral magnifications of the captured images of the right camera 107 and the left camera 108 are smaller than that of the captured image of the back camera 109.

Figure 5:
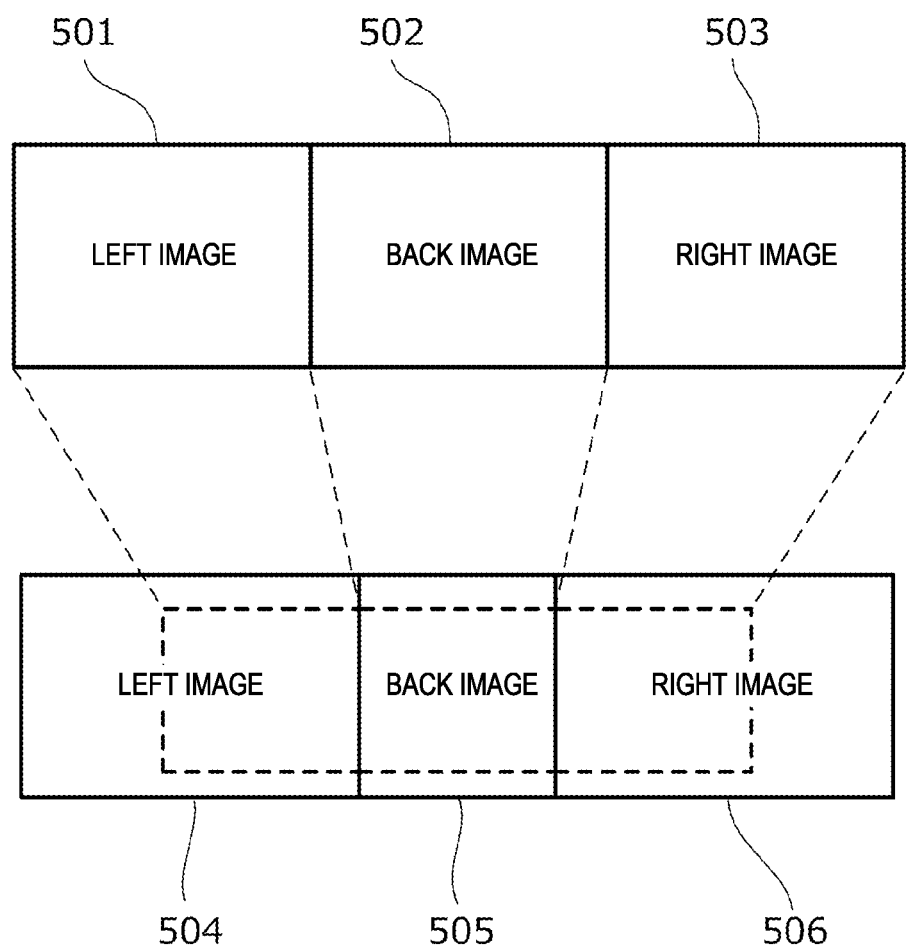
FIG. 5 is a conceptual diagram for illustrating an example of switching a display image of the display device according to the first embodiment.

FIG. 5 is a diagram for illustrating an example of switching a display image of the display device according to the first embodiment. In FIG. 5, an upper part shows a configuration of a display image displayed on the display of the display device 112 in a normal time. According to the configuration described with reference to FIG. 3, the display control device 100 generates a display image using a left image 501, a back image 502, and a right image 503 such that the left image 501, the back image 502, and the right image 503 are like a single image captured by one camera, and transmits the display image to the display device 112 for display. In FIG. 5, a lower part shows a configuration of a display image displayed on the display of the display device 112 in a case of the visual field ranges being expanded. Since the visual field ranges (angles of view) of the right camera 107 and the left camera 108 are expanded, a display image in which a range of a surrounding region of the vehicle 1 is broader than in a normal time is displayed on the display of the display device 112. In the first embodiment, a left image 504, a back image 505, and a right image 506 are displayed on the display of the display device 112 so as to include the left image 501, the back image 502, and the right image 503 in a case of a normal time. When the visual field ranges are expanded, contents of generation processing of the images may be different. For example, in a normal time, the display control device 100 may generate the left image 501, the back image 502, and the right image 503 obtained by converting, at the same magnification, the captured images that are captured by the right camera 107, the left camera 108, and the back camera 109 respectively. On the other hand, when the visual field ranges are expanded, the display control device 100 may generate the left image 504, the back image 505, and the right image 506 obtained by converting the captured images captured by the right camera 107 and the left camera 108 to have a smaller lateral magnification than that of the captured image captured by the back camera 109.

By expanding the visual field ranges (angles of view) of the right camera 107 and the left camera 108 based on a control instruction transmitted from the display control device 100, a range of the surrounding region included in the captured images is broadened. The display control device 100 generates a display image to be displayed on the display of the display device 112 by extracting all or a part of the captured image that is captured after expanding the visual field range (angle of view). Note that the display control device 100 may limit a display range by applying an opaque mask to the captured image in addition to extraction of the captured image, and may generate a display image to be displayed on the display of the display device 112. In the display control device 100, the range of the surrounding region of the vehicle 1 indicated by the display image displayed on the display of the display device 112 is further broadened by expanding a range to be extracted from the captured image. In addition, the display control device 100 can increase the degree of freedom of an extraction range to be displayed on the display of the display device 112 by expanding the visual field range (angle of view). In the following description, processing of expanding the range of the surrounding region of the vehicle 1 included in the display image displayed on the display of the display device 112 is referred to as visual field range expansion processing. Processing of narrowing the range of the surrounding region of the vehicle 1 included in the display image displayed on the display of the display device 112 is referred to as visual field range reduction processing.

As described above, in the first embodiment, it is assumed that the display control device 100 does not switch the visual field range (angle of view) of the back camera 109. Therefore, it is assumed that, in both the case of a normal time and the case of the visual field range being expanded, the back camera 109 performs image-capturing at a visual field range (angle of view) such that a captured image corresponding to a visual field range (angle of view) at which the right camera 107 or the left camera 108 performs image-capturing can be obtained.

Figure 6A:
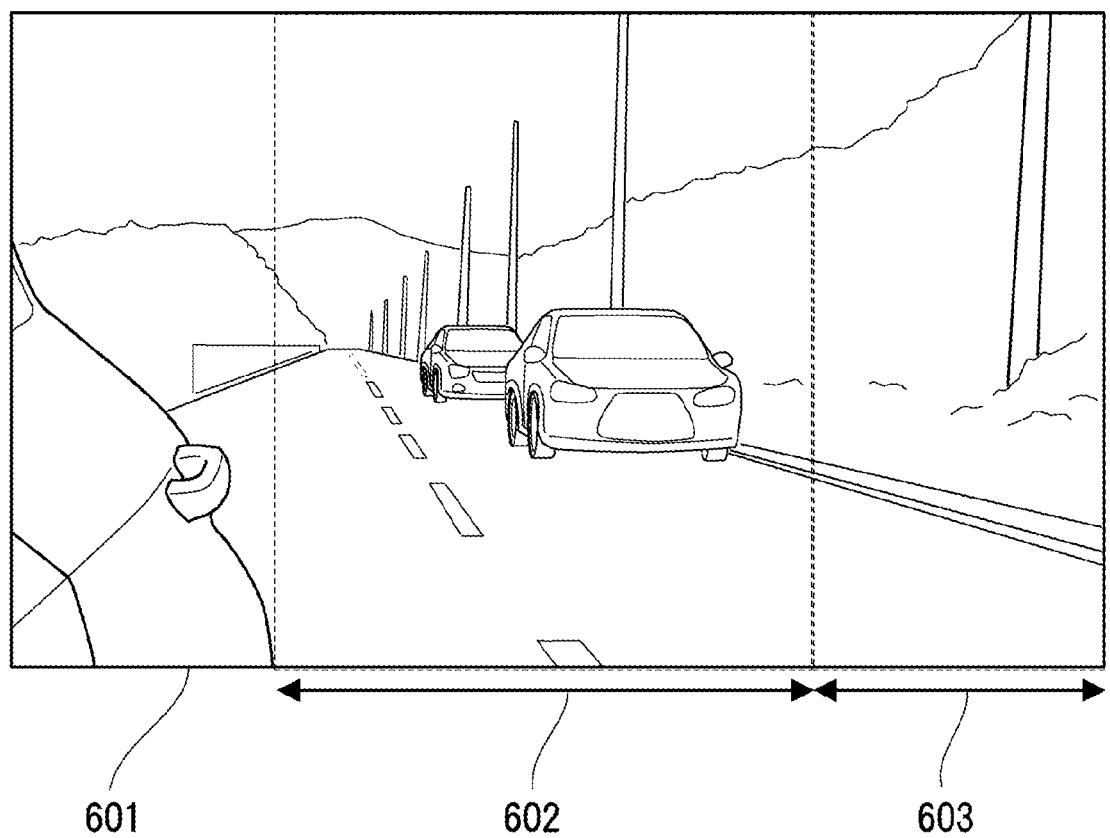
FIG. 6A is a diagram for illustrating an example of switching the display image of the display device according to the first embodiment.
Figure 6B:
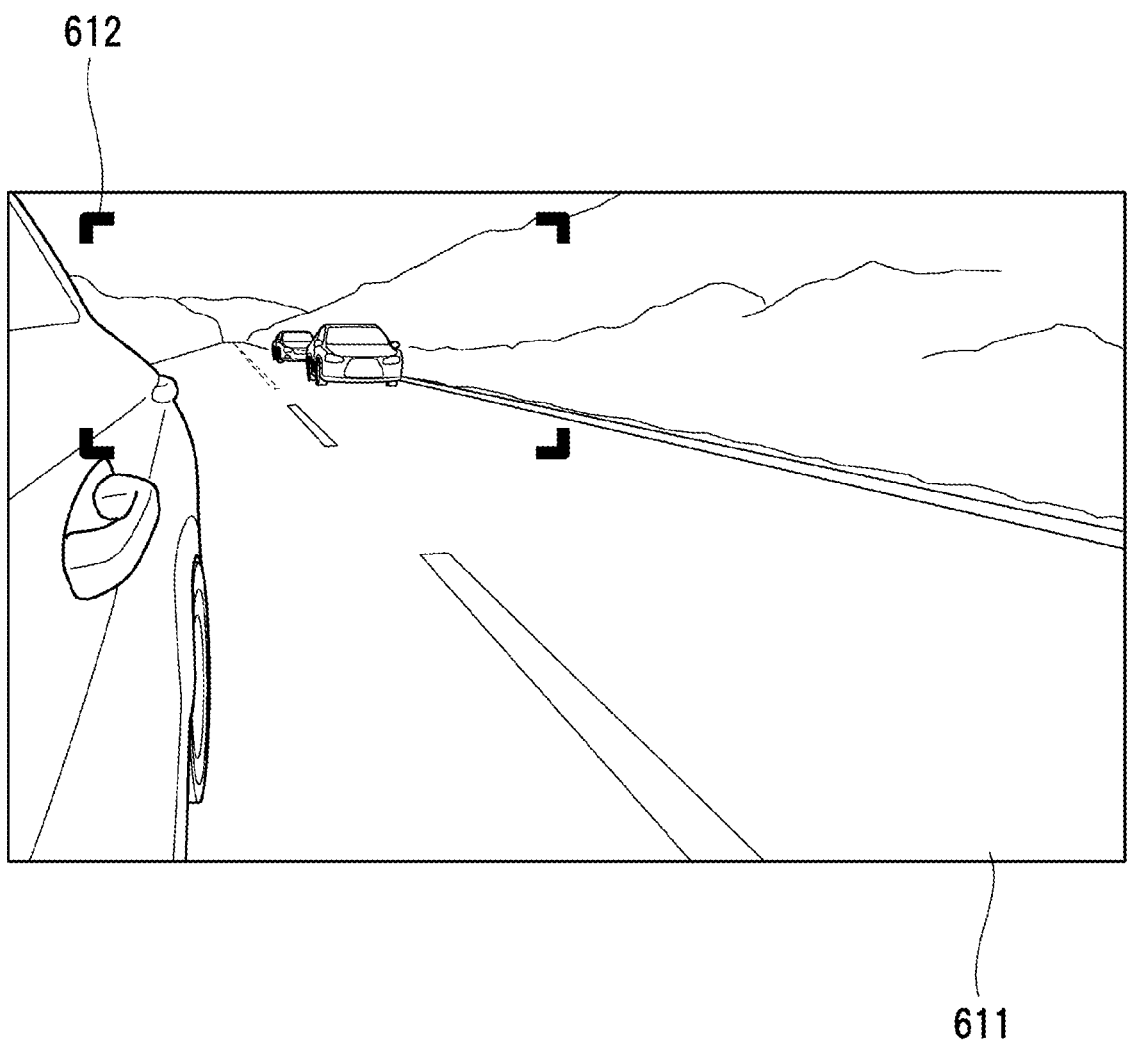
FIG. 6B is a diagram for illustrating an example of switching the display image of the display device according to the first embodiment.

FIGS. 6A and 6B are diagrams for illustrating an example of switching the display images on the display device 112 according to the first embodiment. An example of switching the display images based on captured images of the left camera 108 will be described with reference to FIGS. 6A and 6B. FIG. 6A illustrates a display example in the case of a normal time, and FIG. 6B illustrates a display example in the case of the visual field range being expanded. A display image displayed in a normal time corresponds to a part of a display image in the case of the visual field range being expanded, and a broader range of display is performed when the visual field range is expanded. On the other hand, the display image in the case of a normal time has a configuration in which a predetermined partial area is enlarged and displayed as compared with the display image in the case of the visual field range being expanded.

In the first embodiment, the image controller 104 can generate a display image obtained by applying visibility reduction processing to the captured images captured by the right camera 107 and the left camera 108, and transmit the generated display image to the display device 112, and display the generated display image on the display of the display device 112. In the first embodiment, it is assumed that the image controller 104 performs the visibility reduction processing on regions included in the captured image, for example, in accordance with distances from the vehicle 1. A distance threshold for specifying a region to which the visibility reduction processing is applied may be a value defined in advance as a fixed value, or may be switched according to a running speed of the vehicle 1. Alternatively, a region to which the visibility reduction processing is applied may be determined based on other criteria.

The visibility reduction processing is processing of reducing visibility of a captured image. As the visibility reduction processing, for example, the image controller 104 performs processing to apply one of change in luminance, brightness, or saturation, reduction in resolution, reduction in contrast, superimposition of a predetermined mask, application of a filter for reducing sharpness, or a combination of these to a captured image. The visibility reduction processing may be so-called blurring processing.

In the display image shown in FIG. 6A, a part of the vehicle 1 is displayed as an object 601. The image controller 104 divides the rest part into an area 602 and an area 603 according to the distance from the vehicle 1, and the visibility reduction processing is normally applied to the area 603.

In the area of the display image to which the visibility reduction processing is applied, the part of display image is unclear and is difficult to be visually recognized by the driver. As a result, for example, with the display image, effects can be obtained such as reinforcement of perspective in the display image (that is, application of blurring processing to a distant scene region), reduction of unnecessary visual stimuli (for example, application of change in luminance, brightness or saturation), and visual guidance to a part where the visibility reduction processing is not applied.

The display of the display device 112 may include display for providing various types of information to the driver. For example, in the display image shown in FIG. 6B, the display control device 100 may display an icon 611 indicating that the visual field range (angle of view) is expanded in the display image (that is, a broader range of the surroundings of the vehicle 1 than in a normal time is shown), a frame 612 indicating a notable range as an attention-requiring target, which will be described later, and the like. In addition, the display control device 100 may cause the display of the display device 112 to display an icon or the like that prompts visual recognition for the driver. For example, when a very large siren sound is detected on the right side of the vehicle 1, the display control device 100 may highlight a periphery of the screen 303 on the right side in the display of the display device 112 shown in FIG. 3.

Note that both of the visual field range reduction processing and the visibility reduction processing performed by the display control device 100 are processing of hindering (limiting) an occupant (particularly, the driver) from visually recognizing a broad range of a surrounding condition on the display of the display device 112. The display control device 100 according to the first embodiment focuses on a change in whether presentation of a display image in which a broad range of the surroundings of the vehicle 1 can be visually recognized is desired, and whether presentation of a display image in which visual recognition of a broad range is limited in a certain degree is desired, in accordance with a condition in which the vehicle 1 is placed, and switches the application of processing of hindering visual recognition to the display image to be presented to the occupant.

[Vehicle Condition]

The vehicle 1 according to the first embodiment switches the visual field ranges in accordance with the surrounding environment or a state of the vehicle 1, or switches presence or absence of the visibility reduction processing. Here, as conditions of the vehicle 1, three of a "normal condition", a "caution condition", and "critical condition" will be described as an example.

The normal condition refers to a normal running state of the vehicle 1, and is treated as a condition where the vehicle 1 is not in the caution condition or the critical condition as will be described later. In the first embodiment, it is assumed that the vehicle 1 is moving forward. Therefore, running at the time of reversing is excluded from a running state in the normal condition according to the following description.

The caution condition as an example of a first condition indicates a condition where an event requiring attention is occurring around the vehicle 1 or on the own vehicle, and is identified by the display control device 100 based on the image-capturing information acquired by the camera group 106 or the various types of measurement information acquired by the sensor group 113. The caution condition include, for example, at least one of: a case where a siren sound, a brake sound or a sound of collision is detected; a case where approaching of an attention-requiring target is detected; a case where an earthquake early warning is received; a case where lighting-on of hazard lamps and brake lamps of surrounding vehicles is detected; a case where passing or horn of a following vehicle or oncoming vehicle is detected; a case where a predetermined speed change such as sudden deceleration or sudden acceleration of the own vehicle is detected; a case where approaching of another vehicle at a predetermined speed or over is detected; a case where approaching a predetermined driving area (for example, a confluence point, and a location where the number of lanes is reduced) is detected; a case where intrusion into a predetermined area (for example, a parking lot, a multi-way intersection, a compound intersection) is detected; a case where the driver's predetermined motion (for example, head movement, weight shift in the seat) is detected; a case where running with a steering angle of a predetermined value or more in a predetermined driving area (for example, a highway) is detected; a case where U-turn driving in a predetermined driving area (for example, a highway) is detected; a case where reverse running of the own vehicle or another vehicle is detected; and the like.

The attention-requiring target is a target requiring attention of the driver of the vehicle 1. In addition to emergency vehicles such as police vehicles and ambulances, examples of the attention-requiring target include following vehicles at the time when the own vehicle is stopped or is suddenly decelerating, following vehicles, oncoming vehicles and the like that are passing or honking at the own vehicle, road signs and road markings that can be read in a captured image of the back side (vehicle 1 is running in reverse if the display can be read in the captured image of the back side), or a display warning that the vehicle is running in reverse. The criteria for determining an attention-requiring target may vary depending on the running state of the vehicle 1.

The critical condition an example of a second condition indicates a condition where a critical event is happening to the vehicle 1 or a critical event is likely to happen to the vehicle 1, and is identified by the display control device 100 based on the image-capturing information acquired by the camera group 106 or the various types of measurement information acquired by the sensor group 113. The critical condition includes, for example, at least one of: a case where an impact on the own vehicle is detected; a case where overturning, lateral turning, or vertical turning of the own vehicle is detected; a case where it is detected that the running direction of the vehicle 1 is out of a predetermined range as compared with a direction of a road the vehicle 1 runs on; a case where slipping, spinning, idling running of drive wheels, or locking of wheels of the own vehicle is detected; a case where it is detected that water enters the vehicle, or the own vehicle enters water or falls into water; and the like.

For example, the display control device 100 may compare rotation speeds (wheel speeds) of the four wheels of the vehicle 1, and determine that the wheels are idling running when a difference in rotation speed is equal to or greater than a predetermined threshold. When deceleration of the vehicle 1 indicated by the acceleration sensor and deceleration indicated by the rotation speed (wheel speed) of the wheel are different, the display control device 100 may determine that the vehicle 1 is slipping. When degree of change in orientation of the vehicle body detected by the geomagnetic sensor exceeds a predetermined threshold value, the display control device 100 may determine that the vehicle 1 is spinning. The display control device 100 may determine that the vehicle 1 is spinning in a case where the acceleration sensor detects a horizontal gravity (G) equal to or greater than a predetermined threshold when the vehicle is running on a straight road.

When the acceleration sensor detects acceleration equal to or greater than a predetermined threshold, the display control device 100 may determine that a collision has occurred in the vehicle 1. When a direction of acceleration indicated by the acceleration sensor is a rotation direction around a roll axis, the display control device 100 may determine that the vehicle 1 has laterally turned. When the acceleration sensor detects a steady load in a direction other than a bottom surface direction of the vehicle 1, the display control device 100 may determine that the vehicle 1 has laterally turned. When the water entry sensor detects presence of water, the display control device 100 may determine that the vehicle 1 has fallen into water or entered water or the water has entered the vehicle 1.

Note that the classification of the caution condition and the critical condition is an example, and the present invention is not limited thereto. Further, the information used for determining each case is not particularly limited, and other information acquired at a part included in the camera group 106 or the sensor group 113, map information provided by the navigation device 111, and other information may be used.

U-turn driving and reverse running of the vehicle 1 as an example of the caution condition will be described. For example, in a case where the vehicle 1 is about to take a U turn on a road that is separated by a median strip to have an opposite lane, the vehicle 1 runs in reverse when accidentally taking a U turn without entering the opposite lane of the road separated by the median strip. The reverse running of this type is caused by the driver failing to notice presence of the opposite lane or misidentifying the opposite lane that appears beyond the median strip as a different road rather than the opposite lane of the running road. Therefore, when the vehicle 1 takes a U-turn, the display control device 100 should generate a display image obtained by prohibiting or suppressing visibility reduction processing so that the driver can check a surrounding condition of the vehicle 1 to the maximum, and display the display image on the display of the display device 112.

As an example in which the driver overlooks or misidentifies the surrounding condition and runs in reverse, there is one in which the vehicle first enters a store located on the left side of a road with two lanes on each side, and then leaves the store and turns back, and enters an overtaking lane of a road in front. Further, as an example of the reverse running, there is one in which, at a T junction where a road with one lane on each side meets a road with two lanes on each side and having a median strip, the driver misidentifies the road with two lanes on each side as a road with one lane on each side and turns right, or one in which the vehicle enters a parking area of a highway, and when leaving the parking lot, takes the same road as the one through which the vehicle enters the parking lot, and turns back to a main running line, resulting in reverse running.

In a case of a highway, it is assumed that a location of the vehicle 1 is tracked by a global navigation satellite system (GNSS) by a function of the navigation device 111 to match with a location of a highway on which the vehicle is currently running, and a warning can be given when the vehicle 1 is moving in an opposite direction to a direction in which the vehicle is allowed to run. On the other hand, in a case of a general road, it is assumed that it is not possible to distinguish between a correct driving position on one side of a median strip and an overtaking lane on which the vehicle is running in reverse, and an appropriate warning cannot be made with the navigation device 111. As a method of detecting reverse running without using GNSS, there is a method of performing image processing on a captured image of the back side of the vehicle, and determining that it is reverse running when road signs and road markings are readable.

When the display control device 100 detects reverse running of the own vehicle by some means, it is desirable to generate a display image obtained by prohibiting the visibility reduction processing, and display the display image on the display of the display device 112, thereby allowing the driver to see the surrounding condition to the maximum. This is because it is assumed that, in a case where reverse running occurs, it is possible to suppress a risk of a serious accident when the driver grasps the surrounding condition more quickly. However, since there is a risk of a serious accident after reverse running occurs, it is better to prevent reverse running before reverse running is started. Therefore, it is needless to say that the display control device 100 issues a warning after reverse running is started, but it is desired that, before start of reverse running, the display control device 100 generates a display image obtained by prohibiting or suppressing the visibility reduction processing so that the driver can check the surrounding condition to the maximum, and displays the display image on the display device 112 to prevent the driver from overlooking or misidentifying the surrounding condition to prevent reverse running. In other words, it is better to display an image obtained by prohibiting or suppressing the visibility reduction processing, at a time point when an operation of the vehicle 1 to trigger reverse running is detected.

Examples of the operation of the vehicle 1 triggering reverse running include a U-turn and entry from outside a road or from a narrow road to a main road. In a case where the vehicle 1 enters a main road from a narrow road, the driver is likely to misunderstand that turning right is fine when an angle of entry into the main road is close to a right angle. Therefore, the display control device 100 may determine whether an angle formed by a course of the own vehicle and the main road is equal to or greater than a threshold. Similarly, in a case where the vehicle 1 accidentally enters an overtaking lane of a road in front from outside a road and starts running in reverse, an entry angle is large because the vehicle enters a lane far from the outside of a road. Therefore, the display control device 100 may determine whether an angle formed by a course of the own vehicle and the main road is equal to or greater than a threshold.

It is assumed that the driver needs to recognize the surrounding condition in a wider range than in a normal time in the caution condition and the critical condition as described above. In other words, in a case of prompting the driver to check the surroundings in a wider range, the display control device 100 generates a display image by prohibiting or releasing the visibility reduction processing. The omission (prohibition) of the visibility reduction processing is not limited to prohibiting the application of the visibility reduction processing to the entire area to which the visibility reduction processing is applied (for example, area 603 in FIG. 6A). For example, in a case where a range of an attention-requiring target in the area can be identified, the display control device 100 may prohibit the visibility reduction processing in the specified range.

A range in which the visibility reduction processing is prohibited from being applied to a captured image may be switched according to contents of the caution condition and the critical condition. For example, in a case where a location or direction of a newly detected attention-requiring target can be identified, the display control device 100 prohibits application of the visibility reduction processing to an area corresponding to the location or direction of the attention-requiring target among areas to which the visibility reduction processing is applied, and then generates a display image. In other cases, a display image obtained by prohibiting the application of the visibility reduction processing to the entire captured image may be generated.

A case where the direction of the newly detected attention-requiring target cannot be identified, for example, corresponds to a case where the display control device 100 detects a siren sound from an emergency vehicle, but cannot detect blinking of a rotating lamp provided in the emergency vehicle, and cannot identify the direction in which the emergency vehicle is located. In this case, the display control device 100 generates a display image obtained by prohibiting the application of the visibility reduction processing to the entire captured image, and displays the display image on the display of the display device 112. Thereafter, at a time point when blinking of the rotating lamp of the emergency vehicle is detected, the display control device 100 may switch between display control of performing visual guidance to a direction of the rotating lamp (for example, lighting of an LED, an icon indicating a direction of the rotating lamp, and a frame indicating an area where the rotating lamp is detected), and generation processing of a display image obtained by prohibiting application of the visibility reduction processing to an area corresponding to a location or direction of the rotating lamp.

Further, in a case where it is detected that the own vehicle slips/spins/collides and orientation of the vehicle 1 is different from a normal running direction, the display control device 100 cannot identify a direction in which a following vehicle is assumed to rush (running) toward the vehicle 1. Therefore, it is desired that the display control device 100 performs control to generate a display image obtained by prohibiting application of the visibility reduction processing to the entire captured image, and display the display image on the display of the display device 112 so that the driver can visually recognize a wide range as much as possible.

For example, when the vehicle 1 approaches a confluence point or a location where the number of lanes is reduced during running, it is assumed that the vehicle 1 is interrupted by another vehicle approaching from a lateral side or a back side, or conversely, the own vehicle interrupts other vehicles. In addition, when the vehicle 1 approaches the confluence point or the location where the number of lanes is reduced during running, a two-wheeled vehicle may pass through between four-wheeled vehicles that run at low speeds because of confluence. Therefore, the driver needs to pay attention to the back side of the vehicle 1. Therefore, it is desired that the display control device 100 performs control to generate a display image obtained by prohibiting application of the visibility reduction processing to the entire captured image, and display the display image on the display of the display device 112 so that the driver can visually recognize a wide range as much as possible.

Further, in a case where the own vehicle falls into water or is submerged, the driver is assumed to search for an evacuation route after escaping from the own vehicle. Therefore, it is desirable that the display control device 100 prohibits application of the visibility reduction processing to the entire captured image, generates a display image and displays the display image on the display of the display device 112 so that the driver can visually recognize a wide range around the vehicle 1 as much as possible.

It is also assumed that a field of view of each camera included in the camera group 106 is obstructed by dirt (including snow, ice, and dew drop) on a lens (not shown). The dirt on the lens can be removed by a cleaning function (not shown) to restore the field of view. However, in a case where the display control device 100 generates a display image obtained by applying the visibility reduction processing to a captured image captured using a lens in a dirty state, the driver may be delayed in noticing or unaware that the lens needs to be cleaned. In particular, when the visibility reduction processing is applied to a portion (area) that is blurred by dirt, the driver is less likely to be aware of the dirt. For example, in a condition where the driver needs to check a broad range for turning left or right, the application of the visibility reduction processing. In such a case, even if the driver notices that the lens is dirty and the field of view is obstructed, the driver may not be able to clean the lens in time and turn left or right blindly, causing an accident. Therefore, in a case where the lens is suspected to be dirty due to decrease in luminance or contrast of a captured image, it is desired that the display control device 100 performs control to generate a display image obtained by prohibiting application of the visibility reduction processing to the entire captured image, and display the display image on the display of the display device 112 so that the driver can realized the dirt on the lens.

In addition, in a case where contrast of a captured image is reduced due to a weather condition or climate condition such as snowfall and fog in which visibility of the surroundings of the vehicle 1 is reduced, visual stimulation of the captured image is reduced. Therefore, the display control device 100 does not need to generate a display image obtained by applying the visibility reduction processing to the captured image. In addition, when it snows or fogs, perspective can be obtained since the visibility of distant places is reduced. Accordingly, the display control device 100 does not need to generate a display image obtained by applying the visibility reduction processing to the captured image for a purpose of obtaining perspective.

In addition, when quality of the image is low because the entire captured image is unclear or pitch black, the display control device 100 does not need to generate a display image to which the visibility reduction processing is applied.

Further, a combination of the visual field range expansion processing described with reference to FIG. 4 and prohibition control of the visibility reduction processing will be described.

For example, a case is assumed where orientation of the own vehicle is greatly different from an extending direction of a road as a result of a collision, slip, or the like happened to the vehicle 1. In such a case, an image displayed by the CMS may be in a very different direction than an opposite side of the extending direction of the road. In this condition, a threat to the own vehicle may be that a following vehicle running on the road rushes toward the own vehicle. In such a case, it is more likely that the driver can recognize the threat more quickly and appropriately cope with the threat when the display control device 100 generates a display image capable of displaying a wide range including left and right sides of the own vehicle than when the CMS displays a narrow range of the back side of the vehicle. Therefore, in such a case, it is desirable that the display control device 100 generates a display image subjected to the visual field range expansion processing and the prohibition control of the application of the visibility reduction processing.

Further, a case is assumed where the vehicle 1 is overturned and a pitch angle of each camera with respect to a road surface is largely different from that in a normal time. In such a case, when the display control device 100 causes the CMS to display a display image that displays a narrow range of a back side of the own vehicle, only the sky or the road surface is displayed in the display image. In such a case, the display control device 100 also expands, in the left-right direction and the up-down direction, an area of a captured image of each camera included in the display image displayed by the CMS (that is, a range to be extracted as a display image in a captured image captured by each camera is broadened). Further, for example, the display control device 100 generates a display image containing a following vehicle that rushes toward the own vehicle in a horizontal direction outside the extracted range of the captured image, and causes the CMS to display the display image. Accordingly, it is more likely that the driver can recognize the threat of the following vehicle more quickly and appropriately cope with the threat. Therefore, in such a case, it is desirable that the display control device 100 generates a display image subjected to the visual field range expansion processing and the prohibition control of the application of the visibility reduction processing.

In addition, a case is assumed where the vehicle 1 falls into water from a quay or the like. In such a case, a side loaded with an engine of the vehicle 1 lowers and the vehicle is inclined, and the vehicle 1 is not in a horizontal state. At this time, the display control device 100 generates a display image extracted to include a broader range in vertical and horizontal directions of the back side of the vehicle 1 from captured images, transmits the display image and causes the CMS to display the display image. Accordingly, the driver can visually recognize a condition in a direction in which the vehicle 1 has come, such as the quay. As a result, it is more likely that the driver can grasp a condition such as the falling more quickly and appropriately evacuate. Therefore, in such a case, it is desirable that the display control device 100 generates a display image subjected to the visual field range expansion processing and the prohibition of the application of the visibility reduction processing.

Even if overturning, lateral turning, or falling into water does not occur, a mounting angle of the camera group 106 may be greatly deviated due to deformation or impact of the vehicle 1. In such a case, the display control device 100 generates a display image extracted to include a broader range in the vertical and horizontal directions of each of captured images captured by the cameras, transmits the display image and causes the CMS to display the display image. Accordingly, it is more likely that the driver can grasp the condition more quickly and appropriately cope with the condition. Therefore, in such a case, it is desirable that the display control device 100 generates a display image subjected to the visual field range expansion processing and the prohibition of the application of the visibility reduction processing.

In addition, a case is assumed where the vehicle 1 is spinning due to icing of a road or the like. In such a case, since a flow in a lateral direction of display images following rotation of the vehicle 1 are displayed by the CMS, it is difficult for the driver to grasp what is displayed on the display images. At this time, the display control device 100 displays, on the CMS, a display image generated by extracting to include a broader range including the left and right sides of the vehicle from captured images captured by the cameras, and expands a visual field range of the left and right sides of the vehicle 1. Accordingly, the display control device 100 can cause the driver to feel a slow flow in the lateral direction of the display images displayed on the CMS. As a result, the driver can easily grasp what is displayed on the display images. For example, in a case where the vehicle 1 rotates close to 180 degrees with respect to the extending direction of the road during running, the CMS displays a display image showing a condition in the extending direction of the road. If the driver can grasp whether there is an obstacle in the direction from a screen, it is more likely that more appropriate handling such as taking an impact resistant posture can be achieved. Therefore, in such a case, it is desirable that the display control device 100 generates a display image subjected to the visual field range expansion processing and the prohibition of the application of the visibility reduction processing.

[Flowchart]

Figure 7:
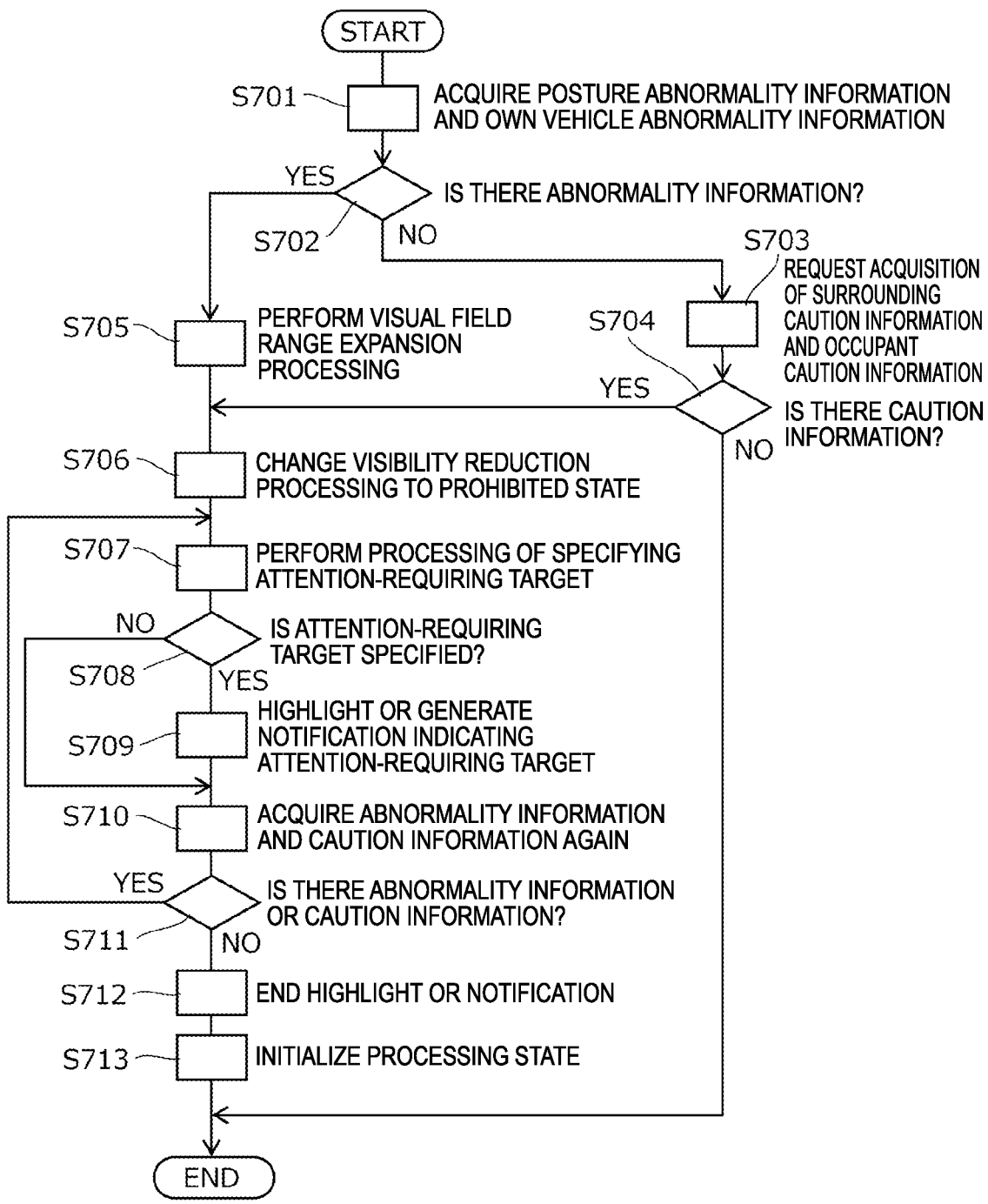
FIG. 7 is a flowchart of a processing procedure example of a display control device according to the first embodiment.

Next, a flowchart of processing of the display control device 100 of the vehicle 1 according to the first embodiment will be described with reference to FIG. 7. FIG. 7 is a flowchart of a processing procedure example of the display control device 100 according to the first embodiment.

As described above, the display control device 100 can acquire map information and geographical information (including road information) of the navigation device 111, image-capturing information of the camera group 106, measurement information of the sensor group 113 and the like as various types of information regarding a driving environment of the vehicle 1.

The display control device 100 requests posture abnormality information and own vehicle abnormality information based on the image-capturing information of the camera group 106 and the measurement information of the sensor group 113 (S701). Here, the posture abnormality information is information indicating the critical condition, and is particularly information indicating that a posture of the vehicle 1 is abnormal. For example, the posture abnormality information includes information indicating overturning, lateral turning, and vertical turning of the vehicle 1 based on a detected roll angle or pitch angle, information indicating an abnormality when a detected yaw angle with respect to a running direction of the vehicle 1 or an extending direction of a road the vehicle 1 runs on exceeds a value exceeding a predetermined range, and the like. Note that the posture abnormality information is not limited to the above, and may be other information. Here, the own vehicle abnormality information is information indicating the critical condition, and is particularly information indicating that an abnormal condition occurs in the vehicle 1. For example, the own vehicle abnormality information includes information indicating that the own vehicle has detected an impact, information indicating that idling running of drive wheels is detected based on a mismatch between a rotation speed of the drive wheels corresponding to an immediately preceding vehicle speed and an actual rotation speed of the drive wheels, information indicating that the immediately preceding vehicle speed is not zero and all the wheels are stopped, information indicating that there is a significant mismatch in rotation speeds of the drive wheels, information indicating that entry of water into the vehicle, entry of the vehicle into water or falling of the vehicle into water is detected, and the like. The vehicle abnormality information is not limited to the above, and may be other information indicating a state of the vehicle 1 identified by the information detected by the camera group 106 or the sensor group 113. In the following description, the posture abnormality information and the own vehicle abnormality information are also collectively referred to as abnormality information.

The display control device 100 determines whether the abnormality information is acquired in the process of step S701 (S702). When it is determined that the abnormality information is acquired (S702: YES), the processing of the display control device 100 proceeds to step S705. On the other hand, when it is determined that the abnormality information is not acquired (S702: NO), the processing of the display control device 100 proceeds to step S703.

The display control device 100 requests surrounding caution information and occupant caution information that are based on the image-capturing information of the camera group 106 and measurement results of the sensor group 113 (S703). Here, the surrounding caution information is information indicating the above-described caution condition, and particularly is information indicating that an event requiring attention of the driver occurs around the vehicle 1. For example, the surrounding caution information includes at least one of: information indicating that a siren sound, a brake sound, a horn, a horn sound, or a sound of collision is detected; information indicating that a rotating lamp of an emergency vehicle is detected; information indicating that blinking of a hazard lamp is detected; information indicating that a driving position is a predetermined area; and the like. Examples of the predetermined area here include at least one of: a parking lot; a rotary; a multi-way intersection; and a compound intersection. The occupant caution information is information indicating the above-described caution condition, and particularly is information indicating that a predetermined movement is performed by an occupant. For example, the occupant caution information includes at least one of: information indicating that a movement of the head or eyeballs of the driver beyond a predetermined range is detected; information indicating that shift of weight of the driver being performed outside a predetermined range is detected; information indicating that the driver has performed a significant movement to check the surroundings; and the like. In the following description, the surrounding information and the occupant caution information are also collectively referred to as caution information.

The display control device 100 determines whether the caution information is acquired in the process of step S703 (S704). When it is determined that the caution information is acquired (S704: YES), the processing of the display control device 100 proceeds to step S706. On the other hand, when it is determined that the caution information is not acquired (S704: NO), the display control device 100 ends the processing flow. In this case, it is assumed that the vehicle 1 is in the normal condition, and display on the display of the display device 112 can be performed by a normal display (the visual field range (angle of view) of the right camera 107 and the left camera 108 is the angle 402 and visibility reduction processing can be applied).

The display control device 100 changes a mode so that the visual field range (angle of view) of the right camera 107 and the left camera 108 is in an expanded state (S705). Specifically, as illustrated in FIG. 4, the display control device 100 performs control so that the right camera 107 and the left camera 108 have a visual field range (angle of view) from the angle 402 to the angle 401. Further, based on the expanded visual field range, the display control device 100 performs the visual field range expansion processing so that a range of surroundings of the vehicle 1 included in a display image displayed on the display of the display device 112 is broader.

The display control device 100 changes the visibility reduction processing to be in a prohibited state (S706).

The display control device 100 performs processing of specifying an attention-requiring target based on the image-capturing information of the camera group 106 or various measurement results of the sensor group 113 (S707). When the posture abnormality information, the own vehicle abnormality information, or the occupant caution information is acquired, the display control device 100 specifies an object approaching the vehicle 1 in a captured image as an attention-requiring target. In addition, when surrounding caution information indicating that the approaching object is detected is acquired, the display control device 100 specifies the object approaching the vehicle 1 in the captured image as an attention-requiring target. When surrounding caution information indicating that a predetermined sound is detected is acquired, the display control device 100 identifies a direction of the predetermined sound. When surrounding caution information indicating that a lamp or light is detected is acquired, the display control device 100 identifies a direction of blinking light thereof. Note that, in captured images obtained by continuous capturing, a position of an object may not be substantially changed, and an object growing over time therein may be determined to be approaching the vehicle 1. On the other hand, an object, which grows over time and moves to the left or right at the same time in captured images obtained by continuous capturing, may be excluded from objects approaching the vehicle 1 by the display control device 100 since it is considered that the object does not collide with the vehicle 1.

The display control device 100 determines whether the attention-requiring target is specified in the process of step S707 (S708). When it is determined that the attention-requiring target is specified (S708: YES), the processing of the display control device 100 proceeds to step S709. On the other hand, when it is determined that the attention-requiring target is not specified (S708: NO), the processing of the display control device 100 proceeds to step S710.

The display control device 100 performs processing of highlighting the specified attention-requiring target on the display of the display device 112 (for example, processing of surrounding the attention-requiring target with a frame) (S709). At the same time, the display control device 100 notifies the driver that the attention-requiring target is specified and is approaching the vehicle 1. For example, in a case where the attention-requiring target is an object such as another vehicle, the display control device 100 may highlight the object by surrounding the object with the frame 612 as shown in FIG. 6B, and further change luminance or the like in the frame 612. In addition, in a case where a warning target is a sound, the display control device 100 may perform display (for example, hint by an icon such as an arrow) of showing a direction in which the sound is generated in a display image, or notify the driver of the direction by outputting a sound signal to a speaker (not shown) installed on a side where the sound is generated to output sounds.

For a second time, the display control device 100 requests the posture abnormality information, the own vehicle abnormality information, the surrounding caution information, and the occupant caution information that are based on the image-capturing information of the camera group 106 and the measurement information of the sensor group 113 (S710). The acquisition processing here may be the same as in the processes of steps S701 and S703. Here, it is assumed that information that has not been acquired is acquired.

The display control device 100 determines whether the abnormality information or the caution information is acquired in the process of step S710 (S711). The display control device 100 determines whether neither the abnormality information nor the caution information has been acquired again over a predetermined continuous time period (for example, 10 seconds) set in advance. When neither the abnormality information nor the caution information is acquired over the predetermined continuous time period, the display control device 100 determines that an abnormality or an event requiring attention indicated by the information acquired in the process of step S701 or step S703 is eliminated. Note that, in the process of step S711, the display control device 100 may exclude the occupant caution information from determination targets since the occupant has already been urged to pay attention. When it is determined that neither the abnormality information nor the caution information is not acquired again (S711: NO), the processing of the display control device 100 ends the highlight/notification of the warning target performed in step S709 (S712). On the other hand, when it is determined that the abnormality information or the caution information is acquired (S711: YES), the processing of the display control device 100 is returned to step S707 and subsequent processes are repeated.

The display control device 100 initializes the mode changed in steps S705 and S706 (S713). Specifically, as illustrated in FIG. 4, the display control device 100 performs control so that the right camera 107 and the left camera 108 to have a visual field range (angle of view) from the angle 401 to the angle 402. The display control device 100 releases the prohibited state of the visibility reduction processing. Then, the processing flow ends.

As described above, the display control device 100 according to the first embodiment includes: the image processor 101 that performs image processing on captured images of the camera group 106 installed in the vehicle 1 and generates an image to be displayed on the display device 112; and the condition determiner 103 that determines whether the vehicle 1 is in a caution condition based on various types of information acquired by the camera group 106, the navigation device 111, and the sensor group 113. Further, the image controller 104 can apply processing for hindering visual recognition of the occupant of the vehicle 1 to an image to be displayed on the display device 112. Further, when the condition determiner 103 determines that the vehicle 1 is in a caution condition, the image controller 104 prohibits the application of the processing for hindering visual recognition to a captured image, or reduces an application degree of the processing for hindering visual recognition.

Although the visual field range is expanded in step S705 and the visibility reduction processing is prohibited in step S706 in the present embodiment, the visibility reduction processing may be prohibited in step S705, and the visual field range may be expanded in step S706. With respect to this order change, since both processes are performed regardless of the order when there is the abnormality information, there is no change in effects, but only the visual field range is expanded when there is caution information. This is a part in which the application is to be changed depending on which of the visibility and the visual field range is weighed heavily, that is, basic ideas behind a design. Although the flow is different from that in FIG. 7, when there is caution information, visual field range expansion and limitation of the visibility reduction processing may be performed in a limited manner, and when there is abnormality information, the visual field range expansion and the limitation of the visibility reduction processing may be performed to the maximum. Alternatively, both of the visual field range expansion and the inhibition of the visibility reduction processing may be performed in both cases without distinguishing the abnormality information and the caution information.

Accordingly, the display control device 100 can provide the driver with a display image that prompts appropriate visual recognition of a surrounding environment in accordance with a condition of the vehicle 1.

Further, the condition determiner 103 further determines whether the vehicle 1 is in a critical condition. When the condition determiner 103 determines that the vehicle 1 is in a critical condition, the image processor 101 prohibits the application of the processing for hindering visual recognition to a captured image, or reduces an application degree thereof further than an application degree of the processing for hindering visual recognition that is applied to a captured image when it is determined that the vehicle is in a caution condition. Accordingly, the display control device 100 can provide the driver with a display image, which prompts more appropriate visual recognition of a surrounding environment, in accordance with a condition of the vehicle 1.

The condition determiner 103 determines that the vehicle 1 is in a critical condition in at least any one of a case where an impact on the vehicle 1 is detected, a case where overturning, lateral turning, or vertical turning of the vehicle 1 is detected, a case where it is detected that a running direction of the vehicle 1 is out of a predetermined range as compared with a direction of a road the vehicle 1 runs on, a case where slipping, spinning, idling running of drive wheels, or locking of wheels of the vehicle 1 is detected, and a case where it is detected that water enters the vehicle 1, or the vehicle 1 enters water or falls into water. Accordingly, the display control device 100 can provide the driver with a display image, which prompts more appropriate visual recognition of a surrounding environment, in accordance with a specific critical condition of the vehicle 1.

The condition determiner 103 determines a caution condition in at least any one of a case where a siren sound, a brake sound, a horn, a horn sound, or a sound of collision is detected, a case where a rotating lamp or blinking of a hazard lamp is detected, a case where it is detected that a driving position is in a parking lot, a rotary, a multi-way intersection, or a compound intersection, a case where a predetermined motion of the head of eyeballs of the driver is detected based on an image of an vehicle interior, and a case where a predetermined weight shift of the driver is detected. Accordingly, the display control device 100 can provide the driver with a display image, which prompts more appropriate visual recognition of a surrounding environment, in accordance with a caution condition of the vehicle 1.

Further, in the case where application of processing for hindering visual recognition to a captured image is prohibited or an application degree of the processing for hindering visual recognition is reduced, the image controller 104 controls display of a display image to perform visual guidance to an object in an image displayed by the display device 112 that approaches the vehicle 1 or that the vehicle 1 approaches. Accordingly, the display control device 100 makes it possible for the driver to more appropriately recognize an attention-requiring target.

The display control device 100 further includes a notification device 114 that uses sounds to notify the driver of a direction of an object that approaches the vehicle 1 or an object the vehicle 1 approaches, which is specified based on information acquired by the camera group 106, the navigation device 111, and the sensor group 113 in a case where the application of the processing for hindering visual recognition to a captured image is prohibited or an application degree of the processing of hindering visual recognition is reduced. Accordingly, the display control device 100 makes it possible for the driver to more appropriately recognize an attention-requiring target.

Further, as the processing of hindering visual recognition, the image controller 104 performs processing of extracting a part of a captured image and taking the part as an image to be displayed by the display device 112. Accordingly, the display control device 100 can provide the driver with a display image having a more appropriate visual field range.

Further, as the processing of hindering visual recognition, the image controller 104 performs at least any one of change in luminance, brightness, or saturation, reduction in resolution, reduction in contrast, and superimposition of a mask, with respect to the captured image. Accordingly, the display control device 100 can provide the driver with a display image having a more appropriate visibility.

Other Embodiments

Further, programs and applications for implementing the functions of one or more embodiments described above can be supplied to a system or a device by using a network, a storage medium, or the like, and one or more processors in the system or a computer of the device can read and execute the programs to implement the functions.

Further, the functions may be implemented by a circuit (for example, an application specific integrated circuit (ASIC) or a field programmable gate array (FPGA)) that implements one or more functions.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined optionally in a range not deviating from the spirit of the invention.

The present disclosure is useful as a vehicle display control device, a display control method, and a non-transitory computer-readable medium that, according to a condition of a vehicle or a surrounding condition of the vehicle, provide a driver with image display that prompts more appropriate visual recognition of a surrounding environment of the vehicle.

This application is based on Japanese Patent Application No. 2020-054581, filed on Mar. 25, 2020, the contents of which are incorporated herein by reference.

The invention claimed is:

1. A vehicle display control device configured to control a display image, the display image to be displayed by a display device, the display device installed in a vehicle, the vehicle display control device comprising:
   a processor; and
   a memory comprising instructions that, when executed by the processor, cause the processor to perform operations, the operations comprising:
      when the vehicle is in a normal condition based on at least one of a vehicle state or an ambient state of the vehicle:
         performing processing for reducing visual recognition of a first captured image by a first level for an occupant of the vehicle, the first captured image being captured by at least one image-capturing device installed on the vehicle, the first captured image having a first angle of view in a left-right direction of the vehicle; and
         outputting the first captured image in which the visual recognition is reduced by the first level; and
      when the vehicle is in a caution condition based on the at least one of the vehicle state or the ambient state of the vehicle:
         performing processing for reducing visual recognition of a second captured image by a second level for the occupant of the vehicle, the second level being lower than the first level, the second captured image being captured by the at least one image-capturing device installed on the vehicle, the second captured image having a second angle of view in the left-right direction of the vehicle, the second angle being greater than first angle; and
         outputting the second captured image in which the visual recognition is reduced by the second level.

2. The vehicle display control device according to claim 1,
   wherein at least one of the processing for reducing the visual recognition of the first captured image or the processing for reducing the visual recognition of the second captured image, includes at least one of:
      changing a luminance, a brightness, or a saturation;
      reducing a resolution;
      reducing a contrast;
      superimposing a mask;
      applying a filter for reducing sharpness; or
      applying a blurring process.

3. The vehicle display control device according to claim 1,
   wherein the caution condition includes a detection of at least one of:
      at least one of a siren sound, a brake sound, a horn, a horn sound, or a sound of collision;
      a rotating lamp or blinking of a hazard lamp;
      the vehicle traveling in a parking area, a rotary, a multi-way intersection, or a compound intersection;
      a predetermined motion of at least one of a head of a driver of the vehicle or an eyeball of the driver of the vehicle, based on an image of a vehicle interior; or
      a predetermined weight shift of the driver.

4. The vehicle display control device according to claim 1,
   wherein the vehicle display control device sets the first angle of view in the left-right direction of the vehicle, on the at least one image-capturing device, when the vehicle is in the normal condition based on the at least one of the vehicle state or the ambient state of the vehicle, and
   the vehicle display control device sets the second angle of view in the left-right direction of the vehicle, on the at least one image-capturing device, when the vehicle is in the caution condition based on the at least one of the vehicle state or the ambient state of the vehicle.

5. The vehicle display control device according to claim 1,
   wherein the processing for reducing the visual recognition of the second captured image by the second level, with the second level being lower than the first level, includes stopping performance of the processing for reducing the visual recognition of the second captured image.

6. The vehicle display control device according to claim 1,
   wherein the operations further comprise, when the vehicle is in an emergency condition based on the at least one of the vehicle state or the ambient state of the vehicle:
      performing processing for reducing visual recognition of a third captured image by a third level for the occupant of the vehicle, the third level being lower than the second level, the third captured image being captured by the at least one image-capturing device installed on the vehicle; and
      outputting the third captured image in which the visual recognition is reduced by the third level, and
   wherein the emergency condition is distinct from the caution condition.

7. The vehicle display control device according to claim 6,
   wherein the emergency condition includes a detection of at least one of:
      an impact to the vehicle;
      the vehicle overturning, lateral-turning, or vertical-turning;
      a traveling direction of the vehicle being out of a predetermined range as compared with a direction of a road on which the vehicle is located;
      a wheel of the vehicle slipping;
      the vehicle spinning;
      a wheel of the vehicle idle-running;
      a wheel of the vehicle being locked;
      water entering the vehicle; or
      the vehicle falling into water.

8. A display control method for controlling a display image, the display image to be displayed by a display device, the display device installed in a vehicle, the display control method comprising:
- determining that the vehicle is in a normal condition based on at least one of a vehicle state or an ambient state of the vehicle and, in response to the determining that the vehicle is in the normal condition:
  - performing processing for reducing visual recognition of a first captured image by a first level for an occupant of the vehicle, the first captured image being captured by at least one image-capturing device installed on the vehicle, the first captured image having a first angle of view in a left-right direction of the vehicle; and
  - outputting the first captured image in which the visual recognition is reduced by the first level; and
- determining that the vehicle is in a caution condition based on the at least one of the vehicle state or the ambient state of the vehicle and, in response to the determining that the vehicle is in the caution condition:
  - performing processing for reducing visual recognition of a second captured image by a second level for the occupant of the vehicle, the second level being lower than the first level, the second captured image being captured by the at least one image-capturing device installed on the vehicle, the second captured image having a second angle of view in the left-right direction of the vehicle, the second angle being greater than first angle; and
  - outputting the second captured image in which the visual recognition is reduced by the second level.

9. The display control method according to claim 8, wherein at least one of the processing for reducing the visual recognition of the first captured image or the processing for reducing the visual recognition of the second captured image, includes at least one of:
- changing a luminance, a brightness, or a saturation;
- reducing a resolution;
- reducing a contrast;
- superimposing a mask;
- applying a filter for reducing sharpness; or
- applying a blurring process.

10. The display control method according to claim 8, wherein the caution condition includes a detection of at least one of:
- at least one of a siren sound, a brake sound, a horn, a horn sound, or a sound of collision;
- a rotating lamp or blinking of a hazard lamp;
- the vehicle traveling in a parking area, a rotary, a multi-way intersection, or a compound intersection;
- a predetermined motion of at least one of a head of a driver of the vehicle or an eyeball of the driver of the vehicle, based on an image of a vehicle interior; or
- a predetermined weight shift of the driver.

11. The display control method according to claim 8, further comprising:
- setting the first angle of view in the left-right direction of the vehicle, on the at least one image-capturing device, when the vehicle is in the normal condition based on the at least one of the vehicle state or the ambient state of the vehicle; and
- setting the second angle of view in the left-right direction of the vehicle, on the at least one image-capturing device, when the vehicle is in the caution condition based on the at least one of the vehicle state or the ambient state of the vehicle.

12. The display control method according to claim 8, wherein the processing for reducing the visual recognition of the second captured image by the second level, with the second level being lower than the first level, includes stopping performance of the processing for reducing the visual recognition of the second captured image.

13. The display control method according to claim 8, further comprising:
- when the vehicle is in an emergency condition based on the at least one of the vehicle state or the ambient state of the vehicle:
  - performing processing for reducing visual recognition of a third captured image by a third level for the occupant of the vehicle, the third level being lower than the second level, the third captured image being captured by the at least one image-capturing device installed on the vehicle; and
  - outputting the third captured image in which the visual recognition is reduced by the third level,
- wherein the emergency condition is distinct from the caution condition.

14. The display control method according to claim 13, wherein the emergency condition includes a detection of at least one of:
- an impact to the vehicle;
- the vehicle overturning, lateral-turning, or vertical-turning;
- a traveling direction of the vehicle being out of a predetermined range as compared with a direction of a road on which the vehicle is located;
- a wheel of the vehicle slipping;
- the vehicle spinning;
- a wheel of the vehicle idle-running;
- a wheel of the vehicle being locked;
- water entering the vehicle; or
- the vehicle falling into water.

* * * * *